United States Patent [19]

Boehm

[11] 4,001,786
[45] Jan. 4, 1977

[54] AUTOMATIC CONFIGURATION OF MAIN STORAGE ADDRESSING RANGES

[75] Inventor: Arthur F. Boehm, Roseville, Minn.

[73] Assignee: Sperry Rand Corporation, New York, N.Y.

[22] Filed: July 21, 1975

[21] Appl. No.: 597,843

[52] U.S. Cl. .......................................... 340/172.5
[51] Int. Cl.² ..................................... G06F 13/00
[58] Field of Search ............................. 340/172.5

[56] References Cited

UNITED STATES PATENTS

| 3,292,151 | 12/1966 | Barnes et al. | 340/172.5 |
| 3,389,380 | 6/1968 | Asbaugh et al. | 340/172.5 |
| 3,466,611 | 9/1969 | Weinberger | 340/172.5 |
| 3,889,237 | 6/1975 | Alferness et al. | 340/172.5 |

Primary Examiner—Raulfe B. Zache
Attorney, Agent, or Firm—Thomas J. Nikolai; Kenneth T. Grace; Marshall M. Truex

[57] ABSTRACT

An apparatus for automatically selecting the one of a plurality of main storage units containing a range of addresses which includes the address of the data to be accessed. The storage capacity of each storage unit is simultaneously compared with a portion of the memory address indicative of the data to be accessed to determine whether the memory address is greater than, less than or equal to the storage capacity of any memory storage unit. If the memory address is greater than the capacity of a given memory storage unit but less than or equal to the storage capacity of the next adjacent memory storage unit, that unit is automatically selected for response to the full memory address.

19 Claims, 6 Drawing Figures

AUTOMATIC CONFIGURATION OF MAIN STORAGE ADDRESSING RANGES

BACKGROUND OF THE INVENTION

Many present data processing systems have the capacity of adding to the storage capacity of main memory as the need for more storage capacity becomes necessary or desirable. One way of accomplishing this is by adding in modular fashion discrete memory storage units. A data processing system may, as a result, have a main memory comprising a plurality of memory storage units as opposed to one large memory stack.

An inherent problem associated with large storage capacity is the relative slow access time compared to the cycle time of other portions of the computer such as the central processor.

One method of substantially alleviating this problem is by use of a buffer interface disposed between main memory and the processors and the input-output devices. Such an arrangement greatly reduces apparent access time to main memory. The principle which makes this apparent decrease in access time possible is the high probability that data currently being processed stored in buffer storage has a high probability of reuse. This greatly reduces the instances where data has to be retrieved from main memory with consequent apparent speedup in main memory cycle time.

When main memory comprises a plurality of memory storage units, the present invention automatically selects the particular memory storage unit containing the range of addresses expressed in main memory address. Furthermore, the present invention maintains an inventory of the number of main storage units, and the quantity of storage contained in each MSU, and automatically formulates a contiguous addressing range from the available storage when the configuration is changed.

The present invention may be used independently. i.e., as the only interface betweeen main memory and the processor units and input-output units of a data processing system. However; it finds valuable use in conjunction with a high speed storage buffer or cache buffer. The present invention greatly enhances such a high speed buffer by substantially easing the problem of selecting the proper main storage unit.

OBJECTS

It is an object of the present invention to provide a system for selecting the one of a plurality of memory storage unit which includes the address of a particular main memory address.

Another object of the present invention is the automatic maintenance of a contiguous range of storage addresses formed from the available main storage units.

Other objects and many of the attendant advantages of the present invention will become apparent from reading the following description taken in conjunction with the accompanying drawing wherein:

DESCRIPTION OF THE DRAWINGS

FIG. 4 is a truth table illustrating the codes used for the address block sizes of each main storage unit.

DESCRIPTION OF THE INVENTION

Figure 1:
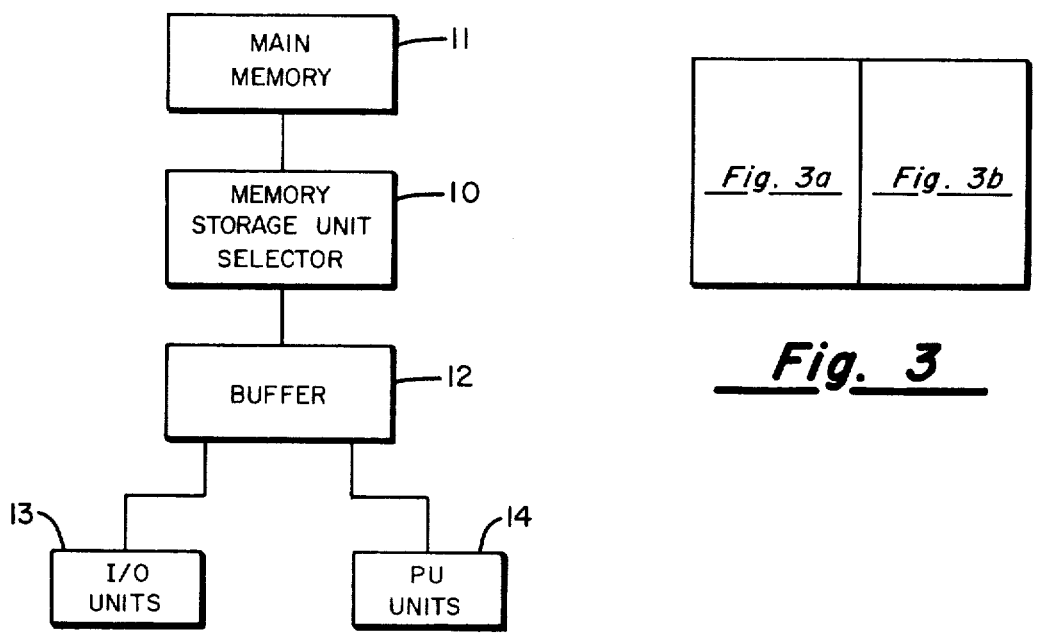
FIG. 1 illustrates in block diagram from a typical data processing system incorporating the present invention.

Referring now more particularly to FIG. 1 there is shown a data processing system employing the memory storage unit selector (MSUS) 10 of the present invention. The MSUS 10 is shown connected between a main memory 11 comprising a plurality of memory storage units and a buffer 12. The buffer 12 is connected to a box 13 which may comprise one or more input-output units or peripheral devices and a box 14 which may comprise one or more processor units 14.

While the MSUS 10 of the present invention has utility independent of a buffer, it is described in connection with the buffer 12 inasmuch as it complements the advantage inherent in the use of a buffer and in addition, in a practical embodiment, it is used in conjunction with a buffer.

The buffer 12 may be similar to that described in U.S. Pat. Application Ser. No. 522,533 for Storage Interface Unit filed on Nov. 11, 1974, which is a high speed buffer providing limited temporary storage of data blocks normally stored in a relatively slow speed main memory. As more fully explained in the above identified patent application, the buffer provides a substantial increase in the apparent speed of main memory by making use of the fact that currently processing data stored in the buffer has an extremely high probability of use.

The present invention finds utitlity where main memory comprises a plurality of memory storage units (MSU) wherein the particular MSU containing the address in main storage is to be automatically selected.

For purposes of describing the present invention, the number of MSU's making up main memory has been chosen to be eight, with each of the eight having capacity or size to store 262K, 524K or 1048K number of words. The total storage capacity is then approximately 8,000,000 words. The number of bits required in each main memory address is dependent on the number of address locations in main storage. For the maximum number of words chosen in the present example, each address has 23 bits. The upper 5 bits of the main memory address is determinative of the number of groups of address blocks each of 262K size. In other words, the 5 bits can have values from 0 to 31 each unit of which is indicative of an address block of 262K words or a total of 32 X 262 blocks or 8,384,000 words. Thus, since each MSU can store 0,262, 524 or 1048K words, each can be said to have a size of 0, 1, 2 or 4 groups of 262K words. This criteria is used in the selection of the appropriate MSU as will be explained more fully hereinbelow.

Figure 2:
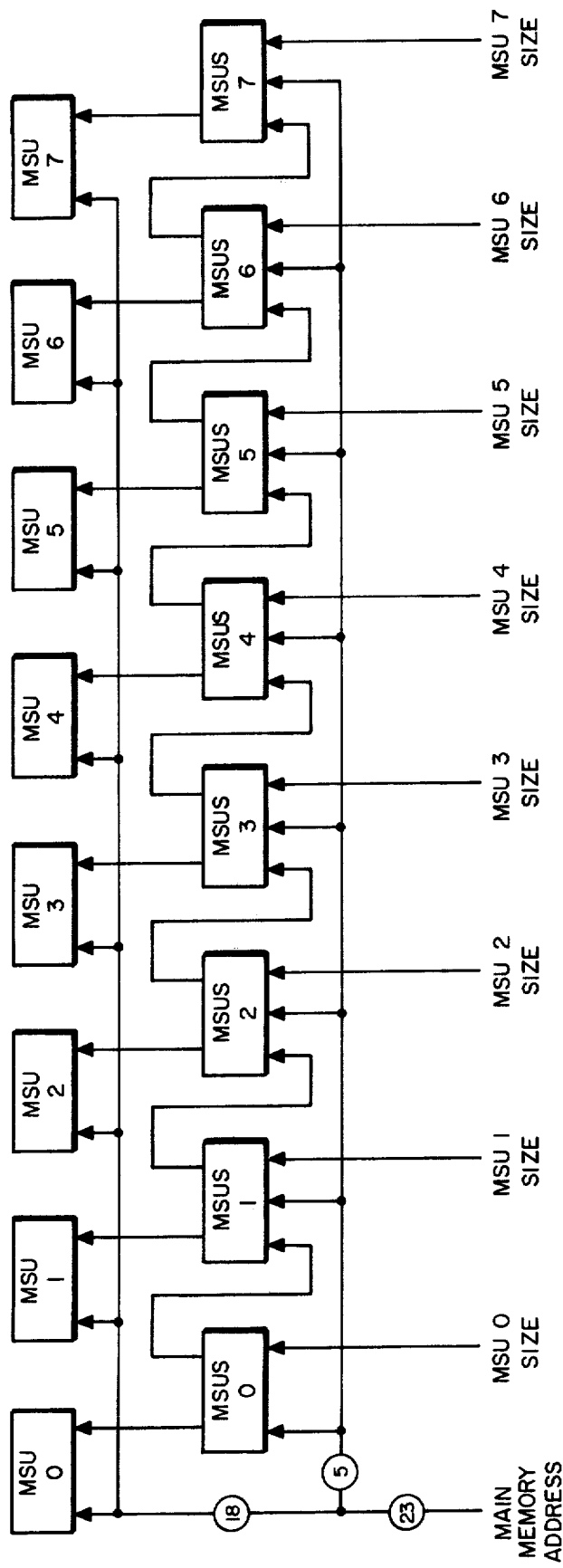
FIG. 2 illustrates in block diagram from a broad representation of the present invention.

FIG. 2 illustrates in block diagram form a representation of the pesent invention. The logical relationships of the eight individual memory selector units (MSUS) labeled MSUS 0 through MSUS 7 with each other and the meory storage units labeled MSU 0 through msu 7 is shown.

As can be seen in FIG. 2 each MSUS 0 through MSUS 7 has an input line labeled MSU 0 size through MSU 7 size, respectively. Each input line provides its MSUS with a code indicative of the size of a respective MSU. The size input may represent 0, 262K, 524K or 1048K depending on the capcity of the particular MSU or on the amount of capacity actually being used by the MSU. By means of panel switches and internal patchwire selections (not shown) one for each MSU, the effective and actual size of each MSU may be changed from 0 to 262K, or 524K or 1048K. When the size input is 0, it may be seen that the particular MSU is effectively eliminated from main storage. In addition, while the size increments 0, 262K, 524K and 1048K have been chosen for purposes of explanation, it should be apparent that the increments may be of any desired value limited only by the size of individual MSU's.

Each MSU 0–7 has an input line carrying the lower 18 bits of the 23 bit main storage address. As aforesaid, the number of bits in the main storage address is a function of the total capacity or total number of address locations in main storage. The number of bits in the main storage address, therefore, may be more or less depending on the number of address locations in main storage. The 18 bits going to each MSU 0–7 access the address location within a 262K block in the MSU selected by means of the present invention.

The upper 5 bits of the main memory address are provided to each MSUS 0 through MSUS 7. These 5 bits may have a value of 00000 to 11111 or expressed in decimal notation, 0 to 31. Each unit (e.g., 1) represents a block of 262k words. Thus, there are a total of 32 × 262K or approximately 8,000,000 words. As will be described, the MSU 0–7 size inputs can have values of 0, 1, 2 or 3 which, expressed in binary code are 00, 01, 10 or 11. This corresponds to a size of 0, 1, 2 or 4 blocks of 262K (0, 262K, 524K or 1048 K).

Each MSUS 0–7 provides an input to each MSU 0–7 respectively. Each MSUS provides an input to the next adjacent MSUS.

For gaining a broad understanding of the present invention MSUS 0 through MSUS 7 may be considered as subtractors and limit comparison circuits. The upper 5 bits of the main storage address is indicative, as aforesaid, of anywhere from 0 to 31 blocks of 262K words while each MSU size input is indicative of 0, 1, 2 or 4 blocks of 262K words.

If the 5 bit input is a 6, i.e., indicative of 6 blocks of 262 words and each MSU size is a 4, i.e., each has a storage capacity of 1048K words, MSU 1 is selected. To arrive at this selection, the 4 unit size provided MSUS 0 on the MSUS 0 size input is subtracted from the 6 input leaving 2. This 2 is put in MSUS 1 and the 4 on the MSUS 1 size input is subtracted leaving a −2 result. since the 6 is greater than 4 but less than 8, MSU 1 is selected.

An example using an actual address and varying MSU sizes is given below. Taking a main storage address of 800K and a size for MSU 0 of 262K, a size for MSU 1 of 0 (effectively locking MSU 1 off line), a size for MSU 2 of 542K, a size for MSU 3 of 262K and each of the remaining MSU sizes of 1048K. The size of MSU 0 is subtracted from 800K, i.e., 800K − 262K = 538K. The size of MSU 1 is subtracted from 538K, i.e., 538K − 0 =538K. The size of MSU 2 is subtracted from 538K, i.e., 538K − 524K = 14K. The size of MSU 3 is subtracted from 14K, i.e., 14K − 262K = −248K. Since this last result is less than 0 and the next to last result is greater than 0, MSU 3 is the memory storage unit selected.

Figure 3A:
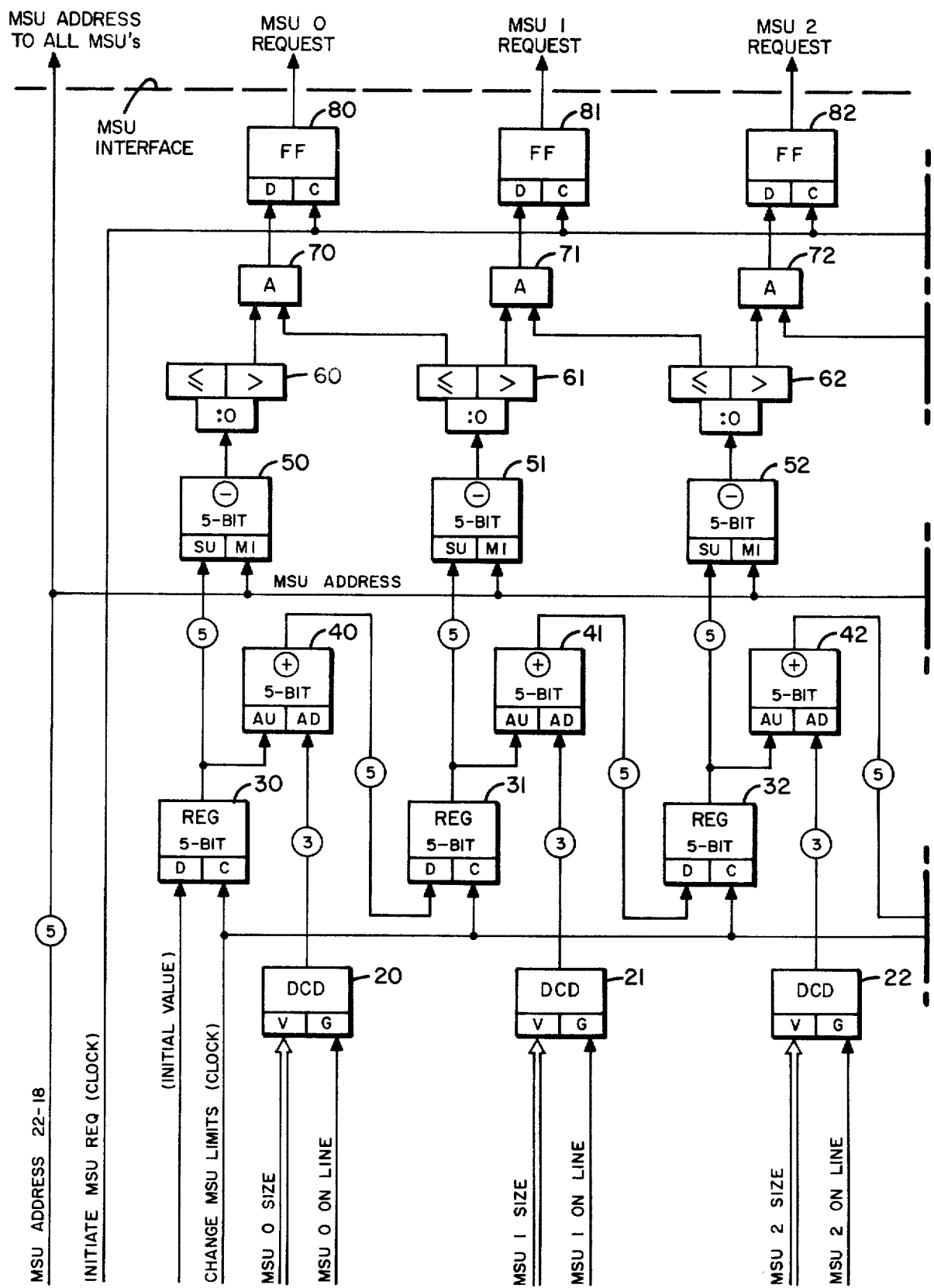
FIGS. 3a and 3b, when arranged as in FIG. 3, are a logic diagram representing the circuitry contained in the blocks labeled MSUS in FIG. 2.
Figure 3B:
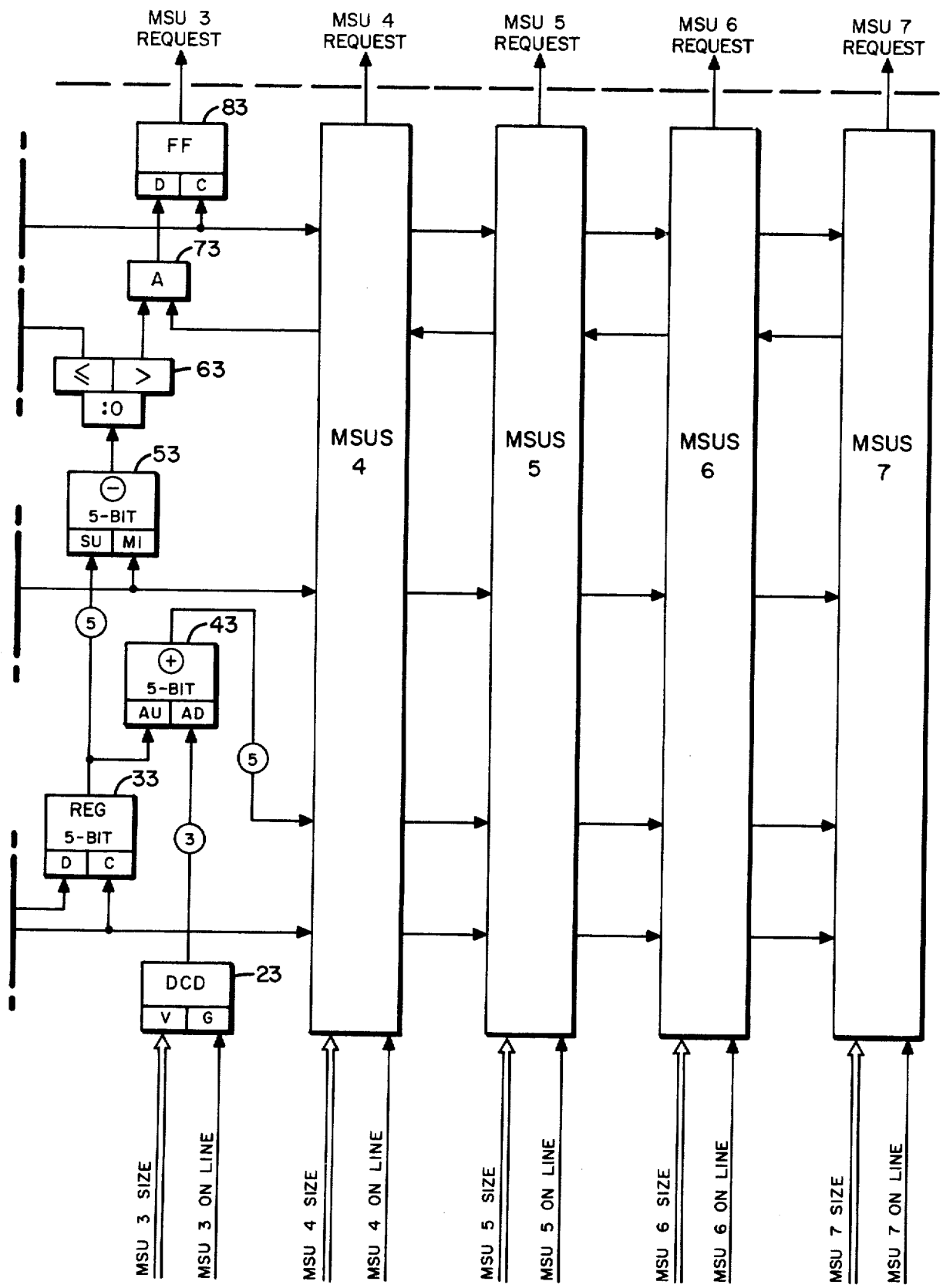

Referring to FIGS. 3a and 3b there is shown a more detailed illustration of the present invention. Each memory storage unit selector MSUS 0 through MSUS 7 contain the identical components. Since each MSUS is identical to the others, only the first four MSUS 0 through MSUS 3 are shown in detail for purposes of explaining the invention.

For explanation purposes of the operation of the invention, octal notation is a short way to express binary code. For example, the octal equivalent of binary 11111 is 37. A simple procedure for converting from binary to octal is to group bits in threes and convert each group into its decimal equivalent beginning with the least significant (rightmost) bit. For example, for 11111 the right three bits 111 equal 7, the next three are 011 or 3. Therefore, the octal equivalent is 37. For binary 10001, the octal equivalent is 21. If this exercise is gone through for many binary numbers, it would be noted there are no 8's or 9's in any of the octal numbers. This is true because octal numbers are a base 8 system. It can easily be seen, for instance, that no group of three bits has a decimal equivalent of 8 or 9. Since only the upper 5 bits of the memory address is used for MSU selection, only the octal number for 5 bit binary numbers has been discussed.

Referring to FIGS. 3i a and 3b the components of each of the four MSUS's as well as component interconnections between MSUS's are shown.

MSUS 0 comprises an MSU size decoder 20, a limit register 30, and adder 40, a subtracter 50, a limit comparator 60, an AND gate 70 and a flip-flop 80.

MSU 1 comprises an MSU size decoder 21, a limit register 31, an adder 41, a subtracter 51, a limit comparator 61, and AND gate 71 and a flip-flop 81.

MSUS 2 comprises an MSU size decoder 22, a limit register 32, an adder 42, a subtracter 52, a limit comparator 62, an AND gate 72, and a flip-flop 82.

MSUS 3 comprises an MSU size decoder 23, a limit register 33, an adder 43, a subtracter 53, a limit comparator 63, an AND gate 73, and a flip-flop 83.

MSUS's 4 through 7 are shown in block form but each contain components identical to each contained in MSUS's 0 through 3.

Each of the decoders 20, 21, 22 and 23 have a value input side having two input lines for inserting the size of its associated MSU that is in use. This value is inserted by means of a two bit code. As shown in the table FIG. 4 the binary number 11 is indicative of a size value of 1048K words, which means that if such a code is inserted into a decoder, the associated MSU has its full storage capacity in service. If the size value input is binary 10, then only one-half or 524K words are in service by the associated MSU. Similarly, the associated MSU has only one-fourth of its storage capacity or 262K words in use when the value input is binary 01. The code 00 is indicative of no storage capacity being used or in other words, the associated MSU is effectively off line.

Obviously the capacity of each MSU and the size value inputs can be more or less and the capcities and size increments have been chosen to enable description of a preferred embodiment.

The size values inserted into each decoder 20, 21, 22 23 may be accomplished by a simple switching or patchwiring arramgement at each MSU (not shown), or other source to connect each of the two input lines to the required combination of high and lows.

In any event, once the size value is applied to a decoder, it remains static until a human operator changes it.

The G or gate input also has to be high for the associated decoder to function. If the G input is low, the MSU is effectively off line and not in service. The G input is also static and once set through panel switches (not shown) by a human operator, it remains in its high or low state until manually changed. Of course, the removal of the G input could be made to automatically occur when an MSU fails.

Each decoder, if it has a G (gate) enabling input, decodes each two bit size values into a three bit code. As more easily seen in FIG. 4, a 00 input is decoded to a 000 or octal 0, a 01 input is decoded to a 001 or octal 1, a 10 input is decoded to a 010 or an octal 2 and a 11 input or an octal 4.

These three bit quantities of decoders 20, 21, 22 and 23 are provided as addends to the addend (AD) side of adders 40, 41, 42 and 43, respectively.

The limit registers 30, 31, 32 and 33 each have a data (D) imput side and a clock (C) input side.

Limit register 30 receives an input on its data side, whose value is one unit less than the start of the address range. This value is dependent on the starting value of the range of address locations in the combined MSU's. For example, if the combined MSU's contained a range of address locations from 8,000K to 16,000K the starting value would have a value determined by that range, one unit less than 8,000,000. in the present description since the range of address locations in the combined MSU's has a starting point of 0 on up to a maximum of 8,000K words the input set into the data portion of limit register 30 is −1.

The outputs from adders 40, 41 and 42 are connected to the data side (D) of the limit registers 31, 32 and 33, respectively.

The outputs from limit registers 30, 31, 32 and 33 are connected respectively to the augend (AU) side of the adders 40, 41, 42 and 43. in addition, the outputs from limit registers 30, 31, 32 and 33 are connected to the subtrahend side of subtracters 50, 51, 52 and 53, respectively.

The clock sides of each of the limit registers 30, 31, 32 and 33 are connected to a clock pulse source (not shown). This clock source is not a recurring source of pulses that is turned on only when a panel switch (not shown) is in the RELEASE position, allowing the configuration to change when an MSU size value is initially inserted in a decoder or when an inserted size value is changed. It remains on at least long enough to permit the newly inserted information to ripple through the decoders and be statically stored in the limit registers, the adders and subtracters of each of the MSUS, and until the panel switch is placed in the LOCK position, thus turning off the clock and preventing further change to the configuration.

The minuend side of each subtracter 50, 51, 52 and 53 is connected to the line carrying the upper five bits of the main memory address.

The output of each subtracter 50, 51, 52 and 53 is connected to the limit comparators 60, 61, 62 and 63, respectively.

Limit comparators 60 through 63 may be of any well-known construction and provides outputs based on whether their inputs are greater than or less than or equal to zero. Except for limit comparator 60, each limit comparator provides two outputs base on whether its input is greater than or less than or equal to zero. The less than or equal output denoted by the sign of comparator 60 output is not used in the present invention, the reason for which will be apparent as the operation of the present invention is described hereinafter.

The greater than (>) outputs of the limit compartors 60, 61, 62 and 63 are respectively connected as one input to AND gates 70, 71, 72 and 73. The less than or equal to ( ) outputs from the limit comparators 61, 62, 63 provide the other inputs to AND gates 70, 71 and 72. The same input from MSUS 4 is shown only as a line from the block representative of MSUS 4.

The AND gates 70, 71, 72 and 73 each provide inputs to the data (D) side of flip-flops 80, 81, 82 and 83, respectively. The clock (C) side of each of flip-flops 80, 81, 82 and 83 are commonly connected to a clock source (not shown) which provides a clock pulse for each new occurring main storage address. This clocks the flip-flop which receives a data input pulse from its associated AND gate to provide an MSU request or selection.

As aforesaid, the line carrying the upper five bits of the 23 bit main memory address is shown in FIGS. 3a and 3b connected to the minuend side of each of the subtracters 50, 51, 52 and 53. It is also connected similarly to the subtracters in MSUS 4 through 7 which is not shown as previously mentioned for the sake of brevity.

The part of the memory address bus carrying the 18 other bits of the full address is not shown since it is not part of the invention which deals only with selection of MSU's. It should be noted, however, that as the appropriate MSU is selected, the rest of the address accesses the appropriate memory location in the selected MSU. Selection of the appropriate MSU and accessing an address location is done simultaneously.

The manner in which the present invention operates to select MSU's is discussed hereinbelow.

As mentioned above, the value side of each decoder 20 through 23 has two input lines by which the amount of storage to be in service by each MSU is inserted. The storage capacity used can be 0, 262K, 524K or 1048K words for which the code used on the two input lines is 00, 01, 10 or 11, respectively. Reference to FIG. 4 shows the decode result, i.e.,,00 = 000 = octal 0; 01 = 001 = octal 2; 10 = 100 = octal 4.

The upper five bits on the MSU address bus that is inserted for each new address into the minuend side of each subtracter 50, 51, 52, 53 and the others (not shown) can range from 00000 or octal 0 through 11111 or octal 37.

In setting up the function of the present invention the initial value is inserted into the data side of limit register 30. In the present description, this value is −1 and represents an address range starting at zero. However, as aforesaid, the value could be different depending on the starting value of the range of address locations in main storage.

When a clock appears on the input line to the clock side of each of the limit registers 30, 31, 32, 33, the data in each of the decoders 20, 21, 22 and 23 flows to the addend side of the adders 40, 41, 42 and 43, respectively.

In addition, the initial value in limit register 30 flows to the augend side of the adder 40 and the subtrahend side of the subtracter 50. At the same time, the summed data in adder 40 flows through limit register 31 to the augend side of adder 41 and the subtrahend side of subtractor 51. Similarly, the summed data from adder 41 flows through limit register 32 to the augend side of adder 42 and the subtrahend side subtracter 52. In like fashion, the summed data in adder 42 flows through limit register 33 to adder 43 to subtracter 53.

The data from adder 43 flows through the limit register (not shown) of MSUS 4, etc. The foregoing data flows take some elapsed time but would be accomplished on a limited number of clock pulses after which the clock may be turned off. Each time the size value is changed at the value input of any one or more of the decoders, the clock must be turned on again to permit each adder to reach its stable state. Once the data flow is complete, each adder 40, 41, 42 and 43 has a sum registered therein which remains static. The input to the subtrahend side of each subtracter is likewise static and the system is ready to select MSU's as the upper 5 bits of each address appears at the minuend side of each of the subtracters.

The summed value in each adder is, of course, dependent on the initial value (−1 in this case) and the MSU size value inserted into each decoder.

Several examples of different size values will now be used to illustrate further the operation of the present invention. These values as well as the MSU address values will be kept in a range so that only those MSU's which are detailed, i.e., shown in detail, will be sufficient for the explanation. It should be understood, however, that the invention will function with ranges up to octal 37 in the present embodiment and more if more MSU's, etc., are added.

Assume that the size inserted in each decoder 20, 21, 22 and 23 is 01. Assume also that each of the decoders has a high on the gate side indication that all the MSU's are on line, i.e., in service. The value input of 01, however, means that each MSU has in service only one-fourth of its total storage capacity or 262K words. It should be noted that while a portion of the MSU capacities are in service, the remaining capacity could be added at a later time.

The addend of each adder 40, 41, 42 and 43 has an octal 1 input and therefore the sum out of adder 41 is octal 1. Therefore, the augend of adder 42 has an octal 1 input making its summed output an octal 2.

The subtrahend sides of each subtracter 50, 51, 52 and 53 have octal −1, octal 0, octal 1 and octal 2 inputs.

Now, assume the upper five bits of an address appearing on the minuend side of each subtracter 50, 51, 52 and 53 is equivalent to an octal 1. This means that the input to comparator 60 is an octal 2, i.e., 1 − (− 1) = 2. The input to comparator 61 is an octal 1, i.e., 1 − 0. The input to comparator 62 is an octal 0, i.e., 1 − 1. The input to comparator 63 is an octal −1, i.e., 1 − 2 = 0.

Now, since the input to comparator 60 is an octal 2 which is greater than 0, AND gate 70 receives an input from comparator 60 because 2 greater than 0. Since the input to comparator 61 is an octal 1 which is greater than 0, AND gate 71 receives an input. However, AND gate 70 does not receive a second input since 1 is not less than or equal to 0. Thus, flip-flop 80 receives no input from AND gate 70.

However, the input to comparator 62 is 0 from subtracter 52. Since this is less than or equal to 0, AND gate 71 receives an input from comparator 62. Since AND gate 71 now has two inputs, i.e., one from comparator 61 and one from comparator 62, it provides an output to flip-flop 81. Since each new address to main memory is accompanied by a clock to the clock side of each of the flip-flops 80 through 83, flip-flop 81 provides a request to MSU 1 which selects that MSU for accessing by memory address whose high order 5 bits in this case had a value of 1.

To further illustrate the operation of the present invention, the size values inserted into each decoder will be changed. The change as indicated earlier is actually performed manually at the panel by an operator who knows which MSU is in service or more practically, which MSU is actually assigned to his application.

For this example, assume that the size value input to decoder 20 is the two bit code 11 equivalent to 1048K words or in octal notation, a 4.

The size value input to decoder 21 is the two bit code 00 which means that MSU 1 is not in service or assigned to a particular application. The octal equivalent of this code is 0. Note that the same 0 input would occur if the gate input of decoder 21 had no high. This might occur if the MSU involved had broken down or for any other reason was out of service. For this occurrence, the associated MSU would be out of use regardless of the size value inserted into the associated decoder.

The size value inserted into decoder 22 is the two bit code 10 of octal 2, the equivalent of 524K words.

The size value inserted into decoder 23 is the two bit code 01 or octal 1, the equivalent of 262K words.

The initial value in limit register 30 is still −1.

Since this is a change in size value, the clock to the clock side of each limit register 30, 31, 32 and 33 must have been turned on until the sums registered in each adder are complete and static and the subtrahends registered in each subtracter are likewise static.

Now, assume the upper five bits of an address appearing on the MSU address bus is an octal 5.

Without going through the previously detailed explanation, it should be clear that the input to the subtrahend side of the subtracter 50 is −1. The summed output of adder 40 is octal 3 and hence the subtrahend input to subtracter 51 is octal 3. The summed output of adder 41 is also 3 because the size input to decoder 21 was 0 and hence the subtrahend input to subtracter 52 is octal 3.

However, the summed output of adder 42 is octal 5 and hence the subtrahend input to subtracter 53 is 5.

The input to comparator 60 from subtracter 50 is octal 6 which is greter than zero and AND gate 70 receives an input from compartor 60.

AND gate 70 does not receive an input from comparator 61 since the input to comparator 61 is 2, which is still greater than 0. Thus, AND gate 70 has no output.

Comparator 61 provides an input to AND gate 71 because its intput from subtracter 61 is octal 2 which is greater than 0.

Comparator 62 whose input from subtracter 52 is 2 due to the 0 size value from decoder 21 provides no input to AND gate 71. AND gate 71, therefore, has not output. However, comparator 62 provides an input to AND gate 72 since its input of octal 2 is greater than 0.

Subtracter 53 with a subtrahend input of octal 5 and a minuend input of octal 5 provides a 0 input to comparator 63 which is less than or equal to 0. Hence, AND gate 72 receives its second input and provides an input to the data side of flip-flop 82 which, on a clock pulse, provides a request pulse to MSU 2 which selects MSU 2 for access.

Since the 0 input to comparator 63 is not greater than 0, AND gate 73 will not get and input from comparator 63. In short, the selection process is completed once an MSU has been selected. The selection process is parallel as opposed to serial, i.e., all limits are compared simultaneously and an MSU is selected on a single clock pulse.

Naturally, the value of the highest main storage address is limited by the total capcity of the MSU's in service. For the example just given, an address whose upper five bits is 11101 or octal 35, there would be no storage location in any of the MSU's. If such a case would arise in actual practice, it would represent a programming error because the real address locations for an application should not exceed the available storage capacity. If more storage were required for a particular application, either the size values inserted into each decoder would have to be increased or alternatively, more MSU's might be added to main storage.

If the size value inserted into each decoder were octal 4, there would be enough storage in service to accommodate addresses having an upper five bits of 11111 or octal 37. In this case MSU 7 would be selected.

If the data processing system shown in FIG. 1 comprised more memory storage units, e.g., a total of 16, a circuit identical to that of FIG. 3 could be used to select MSU 8 through 16 by changing the inital value. For example, if the storage locations ranged from 8,000,000 words to 16,000,000 words, the initial value input to limit register 30 would be octal 37. A serparate circuit identical to FIG. 3 is required. Alternately an extra bit could be added to main storage address so that the upper six bits of that address would be applied to the minuend of each subracter 50 through 53.

Thus, if the upper six bits of the main storage address were octal 44, i.e., 100100 and the size values inserted into each decoder were octal 2, the summed value out of adder 40 would be 37 + 2 = 41 in octal, the summed value out of adder 41 would be octal 43 and out of adder 42 the summed value would be octal 45.

The octal value into the subtrahend sides of subtracters 50, 51, 52 and 53 would be octal 37, 41, 43 and 45, respectively.

Since the upper six bits of the address of 44, the input to comparator 60, 61, 62 and 63 are 44 − 37 = 5, 44 − 41 = 3, 44 − 43 = +1 and 44 − 45 = −1. Since 1 is greater than 0, comparator 62 provides an input to AND gate 72. Since −1 is less than or equal to 0, comparator 63 provides an input to AND gate 72. Since AND gate 72 has two inputs, MSU 2 (in reality MSU 10 since we are working with MSU's 8 through 16) is selected. It is easily seen how other MSU's are selected from the previous examples. It is easily seen how other MSU's are selected from the previous examples. In addition, other MSU's could be added to the overall system. For each group of eight MSU's added, there would need to be a separate circuit like that shown in FIG. 3.

If it were desired to have the end of an address range at a particular boundary, rather than the start of the range, as in the examples, and use the upper five bits of the main storage address as a negative deflection (for example, having the right boundary fixed at 8,000,000, yielding a range of 6,000,000 to 8,000,000 for 2,000,000 words of storage, 4,000,000 to 8,000,000 for 4,000,000 words, etc.), a subtraction technique, i.e., initial value minus each subsequent size value inserted into the decoders would be used. In this case, the adders would in effect be subtracters because they would be adding a negative number to a positive number.

What is claimed is:

1. A system for use in data processing system for selecting one of a plurality of memory storage units which make up main memory, comprising in combination:
   a memory storage unit selector connected to each memory storage unit;
   first means for providing each memory storage unit selector with the size of the storage capacity of its associated memory storage unit;
   second means for providing each memory storage unit selector with a selected portion of the main memory address;
   each of said memory storage unit selectors accumulating its size input with the size input of the preceding memory storage unit selector and comparing the resulting accumulations with said selected portion of the main memory address to selected a memory storage unit when said selected portion of the main memory address falls within the range of the sizes accumulated in the associated memory storage unit selector.

2. A system according to claim 1 wherein each of said memory storage unit selectors comprises:
   a decoder for receiving said size input;
   a limit register;
   an adder connected to said decoder and said limit register providing as an output the sum of the outputs from said decoder and said limit register;
   a subtracter for receiving said selected portion main memory address and the output from said limit register providing as an output the difference between said selected portion of the main memory address and the output from said limit register.

3. A system according to claim 2 wherein: said adder of each memory storage unit selector provides its output as an input to the limit register of the next successive memory storage unit selector.

4. A system according to claim 3 wherein each of said memory storage unit selector comprises:
   a comparator having first and second output terminals for providing an output on said first output terminal when its input is greater than zero and an output on said second output terminal when its input is less than or equal to zero;
   an AND gate;
   each AND gate connected to said first output terminal of each of said comparators and to said second output terminal of the next successive one of said comparators;
   a flip-flop connected to the output of each AND gate;
   each of said flip-flops being connected to a respective one of the memory storage units.

5. A system according to claim 4 wherein: each of said decoders has two input terminals for receiving a code indicative of the storage capacity in service by its associated memory storage unit and a gate input terminal for receiving an input indicative of its associated memory storage unit being in service.

6. A system according to claim 5 wherein:
   each of said limit registers has a data input side and a clock input side;
   input means to the data input side of the limit register of the first memory storage unit selector for inserting an initial value indicative of the starting range of addresses for the memory storage units;
   each of the remaining limit registers receiving at its data side the output of the adder in the preceding memory storage unit selector;

means for applying a clock to the clock side of each of said limit registers until data is statically registered in each limit register.

7. A claim according to claim 6 wherein:
each of the adders comprise and augend side connected to the output of its respective limit register and an addend side connected to the output of its respective decoder.

8. A claim according to claim 7 wherein:
each of said subtracters comprise a minuend input side connected to receive said selected portion of the main memory address and a subtrahend input side connected to the output of its respective limit register.

9. A system according to claim 8 wherein:
each of said flip-flops has a data input side connected to the output of its respective AND gate and a clock input side connected to a clock source for clocking a selection pulse to its associated memory storage unit when its respective AND gate hs an input from said comparator and the next successive comparator.

10. A system according to claim 9 wherein:
said selected portion of the main memory address is a predetermined number of the most significant bits of the main memory address indicative of a number of memory address blocks of a predetermined size, and
the size input to each decoder is a two bit binary code indicative of the number of memory address blocks of predetermined size in service by its associated memory storage unit.

11. A system according to claim 10 wherein:
each time one or more of the decoder size inputs are changed the clock side input of each limit register recieves a clock until all limit register data is stabilized.

12. A memory storage unit selector system comprising in combination:
a plurality of memory storage unit selectors;
a like plurality of memory storage units;
each of said memory storage units connected to a respective one of said memory storage selector units and capable of storing a predetermined number of blocks of words;
means providing each of said memory storage units with a selected portion of each main memory address indicative of the highest number of memory address blocks of a predetermined size contained in the main memory address;
each of said memory storage selector units including means for storing the number of storge blocks in service in its associated memory storage unit;
each of said memory storage selector units including comparison means for comparing the accumulated number of storage blocks in service in its associated memory storage unit with said selected portion of the main storage address to automatically select a memory storage unit when said selected portion of a main storage address falls within the range of accumulated storage blocks in a respective memory storage unit selector.

13. A system according to claim 12 wherein:
the number of storage blocks stored in the associated storage unit is indicative of the number of blocks of address location of predetermined size in service by the memory storage unit.

14. A system according to claim 13 wherein the means for storing in each memory storage unit selector the number of storage blocks in service in its associated memory storage unit comprises:
a decoder having input means for receiving an input indicative of the number of blocks of address locations of predetermined size in service by each memory storage unit;
a limit register having a clock input side and a data input side;
an adder having an augend input side connected to the output of said limit register, an addend input side connected to the output of said decoder and having an output connected to the data input side of the limit register in the next successive memory storage unit whereby a clock on the clock input side of each limit register causes the input indicative of the number of blocks of address locations applied to each decoder to be summed and statically stored in the limit register of the next successive memory storage unit selector.

15. A system according to claim 14 wherein:
the input to the data side of the limit register in the first memory storage unit selector is an inital value indicative of the starting range of addresses for said plurality of said memroy storage units.

16. A system according to claim 15 wherein:
said selected portion of each main memory address comprises a predtermined number of the most significant bits of the main memory address indicative of the number of blocks of address locations of predetermined size contained in the main memory address.

17. A claim according to claim 16 wheren said comparison means comprises:
a subtracter comprising a minuend input side connected to receive said selected portion of the main memory address and a subtrahend input side connected to the output of said limit register providing as an output the difference between said selected portion of the main memory address and the output from said limit register;
a comparator having first and second output terminals for providing an output on said first output terminal when its input is greater than zero and an output on said second output terminal when its input is less than or equal to zero;
an AND gate;
said AND gate connected to said first output terminal of said comparator and to the second output terminal of the comparator in the next successive one of said memory storage unit selectors;
a flip-flop connected between said AND gate and the associated memory storage unit.

18. A system according to claim 17 wherein:
said flip-flop has a data input side connected to the output of said AND gate and a clock input side connected to a clock source for clocking a selection pulse to its associated memory storage unit when said AND gate has inputs from said comparator and the comparator in the next successive memory storage unit selector.

19. A system according to claim 18 wherein:
each time said input to the decoder is changed the clock side input of said limit register receives a clock pulse to register the new data in said limit register to reflect the change in said input.

* * * * *

Disclaimer

4,001,786.—*Arthur F. Boehm*, Roseville, Minn. AUTOMATIC CONFIGURATION OF MAIN STORAGE ADDRESSING RANGES. Patent dated Jan. 4, 1977. Disclaimer filed Jan. 24, 1977, by the assignee, *Sperry Rand Corporation*.

Hereby enters this disclaimer to claims 1 through 19 of said patent.

[*Official Gazette March 8, 1977.*]